United States Patent [19]

Matsko

[11] 4,435,291

[45] Mar. 6, 1984

[54] BREAKPOINT CHLORINATION CONTROL SYSTEM

[75] Inventor: Theodore N. Matsko, Richmond Heights, Ohio

[73] Assignee: The Babcock & Wilcox Company, New Orleans, La.

[21] Appl. No.: 360,860

[22] Filed: Mar. 22, 1982

[51] Int. Cl.³ ............................................. C02F 1/76
[52] U.S. Cl. ..................................... 210/739; 137/93; 210/743; 210/754; 210/764; 210/96.1; 210/143; 210/199
[58] Field of Search ................... 137/3, 93; 210/739, 210/743, 753–756, 764, 96.1, 138, 139, 199, 143

[56] References Cited

U.S. PATENT DOCUMENTS

| | | | |
|---|---|---|---|
| 3,528,545 | 9/1970 | Frazel et al. | 210/96.1 |
| 3,732,164 | 5/1973 | Pressley et al. | 210/756 |
| 3,760,829 | 9/1973 | Schuk et al. | 210/739 |
| 4,232,700 | 11/1980 | Sutt | 210/96.1 |
| 4,304,673 | 12/1981 | Reynolds et al. | 210/764 |
| 4,364,835 | 12/1982 | Cheh | 210/757 |

FOREIGN PATENT DOCUMENTS 54-160052  12/1979  Japan .................................. 210/739

Primary Examiner—Peter A. Hruskoci
Attorney, Agent, or Firm—Vytas R. Matas; Robert J. Edwards

[57] ABSTRACT

A method and apparatus for breakpoint chlorination is disclosed which utilizes a control dosing of chlorine as well as a base substance and sulfur dioxide to remove ammonia, disinfect and thereafter dechlorinate waste waters. The chlorine dosage is controlled according to a derivative of residual chlorine with respect to chlorine dosage to provide an accurate control of chlorine to insure oxidation of ammonia in the waste water.

7 Claims, 6 Drawing Figures

BREAKPOINT CHLORINATION CONTROL SYSTEM

FIELD AND BACKGROUND OF THE INVENTION

The present invention relates, in general, to waste water chlorination techniques and, in particular, to a new and useful breakpoint chlorination method and apparatus which regulates the dosing of waste water with chlorine according to a derivative of chlorine residual with respect to the chlorine dose.

A breakpoint chlorination operation removes ammonia ($NH_3$) from waste water by oxidizing the ammonia to nitrogen gas ($N_2$), water and hydrochloric acid (HCl). Mechanically agitated tanks mix the waste water with chlorine gas ($Cl_2$) and a solution of base to neutralize the HCl. In a small reactor, the $NH_3$ and $Cl_2$ reaction occurs rapidly. Then a larger reactor allows residual $Cl_2$ to disinfect the waste water. In a final process step, sulfur dioxide ($SO_2$) dechlorinates the process stream. Such a process requires the control of chlorine concentration, pH and final dechlorination.

The $Cl_2$ remaining in the water stream after the reaction depends on the amount of $Cl_2$ added and the $NH_3$ concentration in the influent. The relationship between these variables is nonlinear. The nonlinearity appears as a variable gain that can be positive or negative, thus complicating the control problem.

In the chlorination of waste waters and the subsequent treatment thereof, it is known to add desired quantities of chlorine, base and sulfur dioxide by utilizing controllable valves which are controlled according to one parameter or another of the treatment apparatus, for example, liquid or gas flow.

SUMMARY OF THE INVENTION

An object of the present invention is to provide a breakpoint chlorination method and apparatus which emphasizes rigor and stability in dosage control rather than rapid response time or the prevention of overshooting.

Another object of the invention is to provide such a breakpoint chlorination method and apparatus which utilizes a derivative of the residual chlorine which respect to the chlorine dose to control the amount of chlorine added to the waste water.

Breakpoint chlorination to oxidize $NH_3$ in waste water, involves the following simplified reactions:

$$Cl_2 + H_2O \rightleftharpoons HOCl + H^+ + Cl^- \quad \text{(Eq. 1)}$$

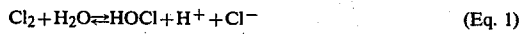

$$NH_4 + 1.5\ HOCl \rightarrow 0.5\ N_2 + 1.5\ H_2O + 2.5\ H^+ + 1.5\ Cl^- \quad \text{(Eq. 2)}$$

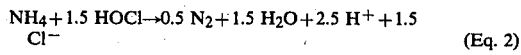

The extent of reaction depends on the $Cl_2$ dose, with a preferred $Cl_2:NH_3$ (as N) weight ratio of 7.6:1.0. Residual chlorine is unreacted chlorine in the form of HOCl or $OCl^-$. With the addition of sufficient $Cl_2$, an elevation of the oxidation-reduction potential initiates the oxidation of $NH_3$. When the reactor operates at a desired set point of chlorine residual, the reaction is complete. Two factors balance the chlorine residual set point; a 1 mg/liter minimum concentration for disinfection purposes, and the economic cost of $Cl_2$ gas.

According to the invention, a feedforward control system computes the $Cl_2$ dose for an ideal breakpoint reaction with influent (water) flow rate and $NH_3$ concentration measurements. However, the $NH_3$ analyzer is not that precise and the reliability of the analyzer is inconsistent. The actual breakpoint dosage is highly variable, ranging from 7.6 to 10.1 in units of $Cl_2$ weight per weight of $NH_3$ in the water. Thus, according to the invention, a more reliable control system also depends on chlorine residual and influent flow measurements. In the invention, the gain of the $Cl_2$ addition system is equal to the derivative of the $Cl_2$ residual (measured as $OCl^-$) with respect to the $Cl_2$ dose $dOCl^-/dCl_2$.

The invention can be implemented by utilizing a NETWORK 90 CONTROLLER MODULE. NETWORK 90 is a trademark of the Bailey Meter Division of the Babcock & Wilcox Company.

While specific embodiments of the invention have been shown and described in detail to illustrate the application of the principles of the invention, it will be understood that the invention may be embodied otherwise without departing from such principles.

DESCRIPTION OF THE PREFERRED EMBODIMENTS

Figure 1:
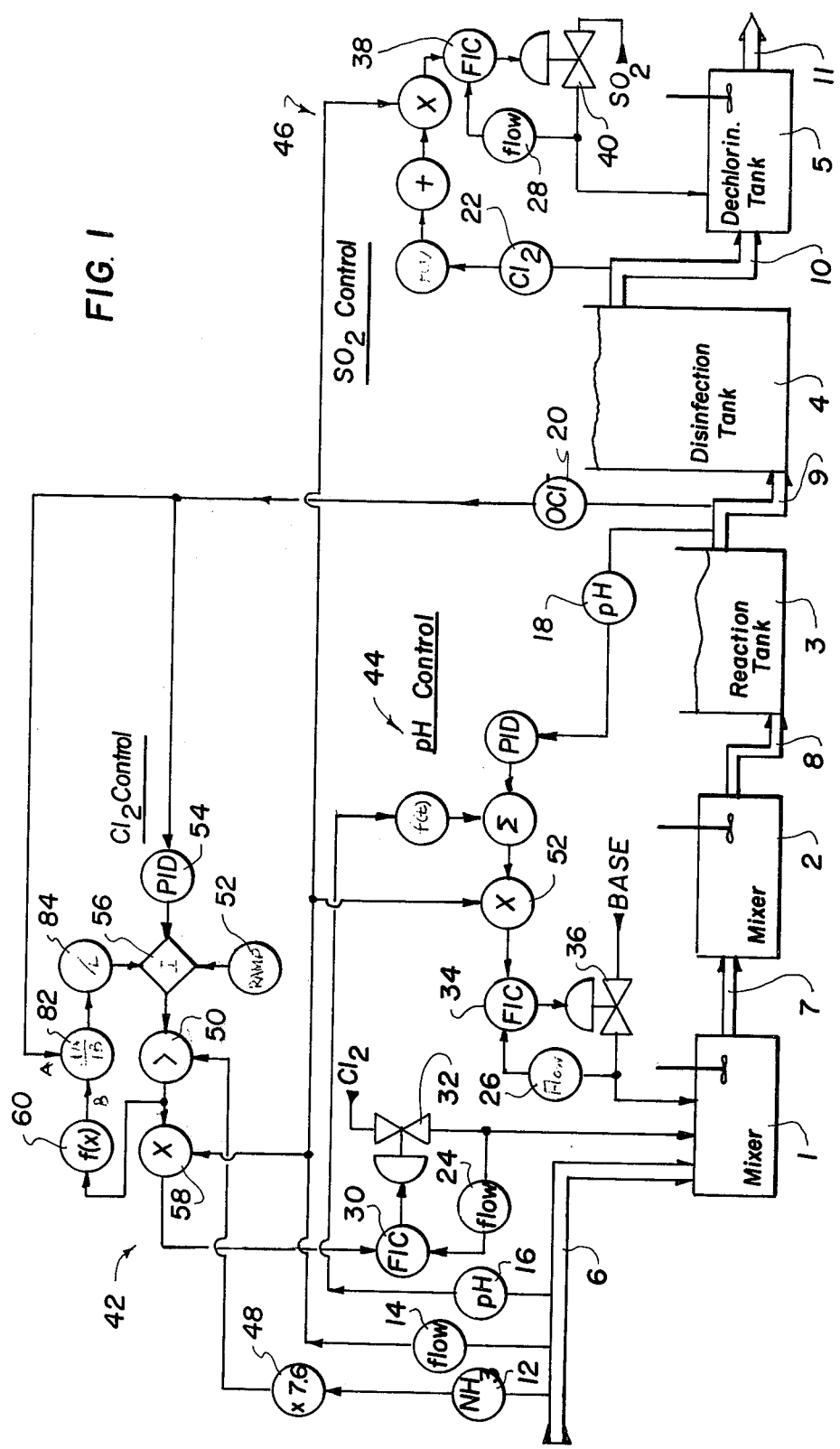
FIG. 1 is a schematic block diagram of a breakpoint chlorination apparatus in accordance with the invention.

Referring to the drawings, in particular, the invention embodied therein in FIG. 1, comprises an apparatus for waste water chlorination.

Waste water is supplied over an inlet conduit 6 to a first mixer 1 where the waste water is mixed with amounts of base and chlorine as supplied by controllable valves 36 and 32, respectively. The thus-treated waste water is supplied over conduit 7 to a second mixer 2, over conduit 8, to a reaction tank 3 where the oxidation reaction takes place, over a further conduit 9 to a disinfection tank 4 where a residual level of chlorine is maintained for disinfection purposes. From tank 4, the water is supplied over conduit 10 to a dechlorination tank which is supplied with a suitable amount of sulfur dioxide over valve 40. The thus-treated water is then released over outlet 11 to the environment.

Chlorine, base and sulfur dioxide valves 32, 36 and 40, respectively, are controlled by electronic controllers 30, 34, and 38, respectively. Controllers 30, 34 and 38 can be operated in accordance with a value transmitted by flow transmitters 24, 26, and 28, respectively, which senses the flow of the chlorine, base or sulfur dioxide to the respective tanks.

In accordance with the invention, however, the controllers 30, 34 and 38 are more accurately controlled at various critical points of the dechlorination process. For this purpose, the invention provides a chlorine-controlled generally designated 42 which operates controller 30, a pH control 44 which operates controller 34 and an SO$_2$ control 46 which operates controller 38.

Before treating the details of the three control units, however, the underlying principles of the invention are here reviewed with reference to FIGS. 2A, 2B, 2C, and 3.

Figure 2A:
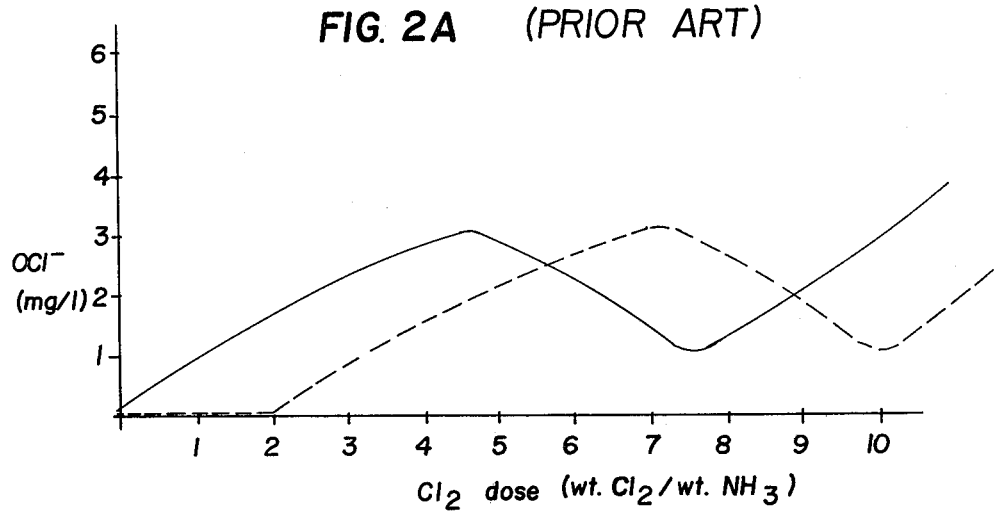
FIG. 2A is a curve showing the chlorine dose plotted against residual chlorine.
Figure 2B:
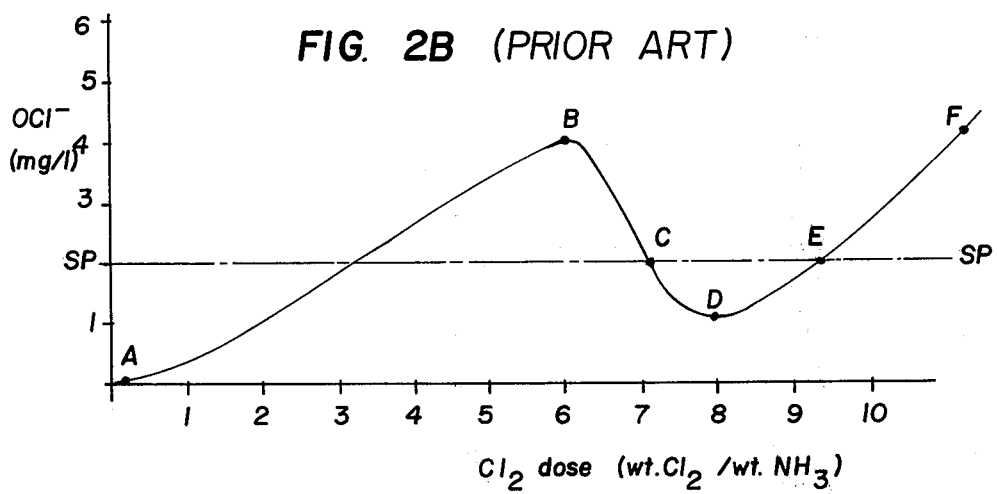
FIG. 2B is a curve similar to FIG. 2A for explanation of the inventive technique.

FIG. 2A is a curve showing an ideal situation (solid line) and a worst case situation (dotted line) for the chlorine dosage plotted against the chlorine residual. The residual chlorine (OCL$^-$) is given in milligrams per liter and the chlorine dosage is given in weight of chlorine per weight of ammonia in the waste water. It is evident from this curve that the actual breakpoint dosage is variable within the range of 7.6 to 10.1. The response of a simple PID feedback system is shown in FIG. 2B. Such a system has difficulty responding to increased load demands. A load disturbance forces the operating point to the left in the curve of FIG. 2B. When the operating point is between C and D, the control system recovers slowly. As the chlorine dosage increases due to positive error in the PID feedback system, the controlled variable decreases. If the controller is tuned properly for operation at the point E, the process variable overshoots due to the integral action. If a load disturbance pushes the operating points between B and C, the error is negative and the controller decreases the chlorine dosage. A new operating points results between points A and B where the reaction does not occur at all.

Figure 2C:
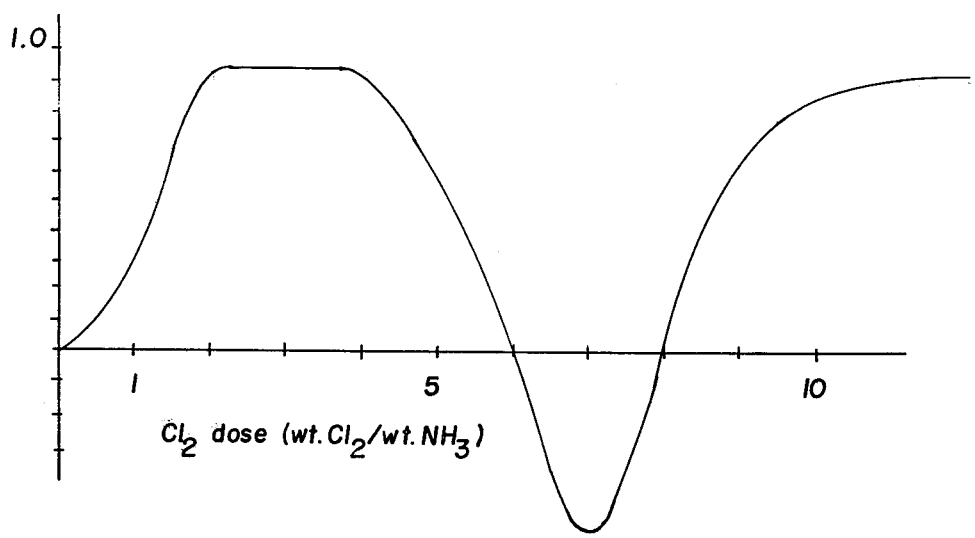
FIG. 2C is a curve plotting chlorine dosage against a derivative of chlorine dosage with respect to residual chlorine.

The method, according to the invention, is illustrated in FIG. 2C where an adaptive control strategy uses a derivative calculation to monitor the change in process gain.

Using an adaptive scheme with the controller gain proportional to $|doCl^-/dCl_2|$ or $|(doCl^--dCl_2)^{-1}|$ however, the control strategy still fails between points B and C. The incorrect negative error signal that occurs between Points B and C causes controller failure. By masking the condition from the controller in the following way, the problem arising between points B and C is solved.

According to the invention and referring once more to FIG. 1, NH$_3$ measurement established a Cl$_2$ floor concentration of 7.6 $\times$ the NH$_3$ mass/volume. This is achieved using first NH$_3$ transmitter 12 and calculating element 48. This floor concentration is the minimum Cl$_2$ requirement in an ideal situation. Even under nonideal conditions, the floor concentration maintains the operating point beyond B (FIG. 2B). When operating between points B and D, the derivative dOCl$^-$/−Cl$_2$ is negative as calculated by element 82. When this occurs, the zero crossing is detected by element 84 which causes an automatic transfer over logic element 56, to replace the error signal from the transmitter 20 to the controller, with a positive constant from element 52. The pseudo error signal provides a ramp in Cl$_2$ dose until dOCl$^-$/dCl$_2$ is positive. The positive derivative as observed in element 56, indicates operation beyond D, thus allowing conventional control to resume. The primary features of this control system are (1) load disturbances do not cause permanent displacement of the operating point to a nonreacting region, and (2) while the robustness of the system degrades, if the NH$_3$ analyzer is out of service, the system is still operational.

The dechlorination reaction produces significant quantities of HCl. If the acid lowers pH below 6, side reactions occur producing explosive, odorous NCl$_3$. If the pH remains high (>8), the amount of nitrates increases. The inventive control system sets the pH at 7, which is considered optimal by some studies, in the pH control 44. The selected control scheme uses a flow control with a cascaded set point. The set point is the sum of feedforward and feedback controller outputs. The feedforward is based on influent pH from first pH transmitter 16, and the feedback is based on effluent pH, from the second pH transmitter 18. Final multiplication by the main flow rate in element 52, scales the addition of base substance over controller 34 and valve 36.

Figure 3:
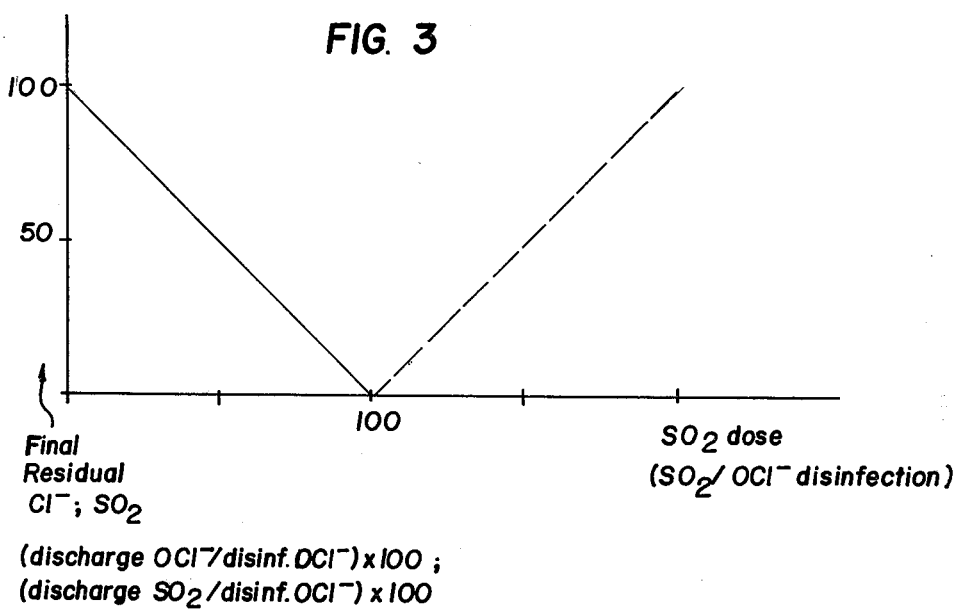
FIG. 3 is a curve plotting sulfur dioxide dosage against residual chlorine.

The chlorine residual is chemically reduced by addition of SO$_2$ before discharging the treated waste water to the environment, in SO$_2$ control 46. FIG. 3 shows the residual concentration of Cl$_2$ and SO$_2$ as a function of SO$_2$ dose/OCl$^-$ disinfection residual. Since the desired OCl$^-$ in the discharge is zero, and measurement of SO$_2$ is difficult, a feedforward control system with a bias insures a slight overdose.

Figure 4:
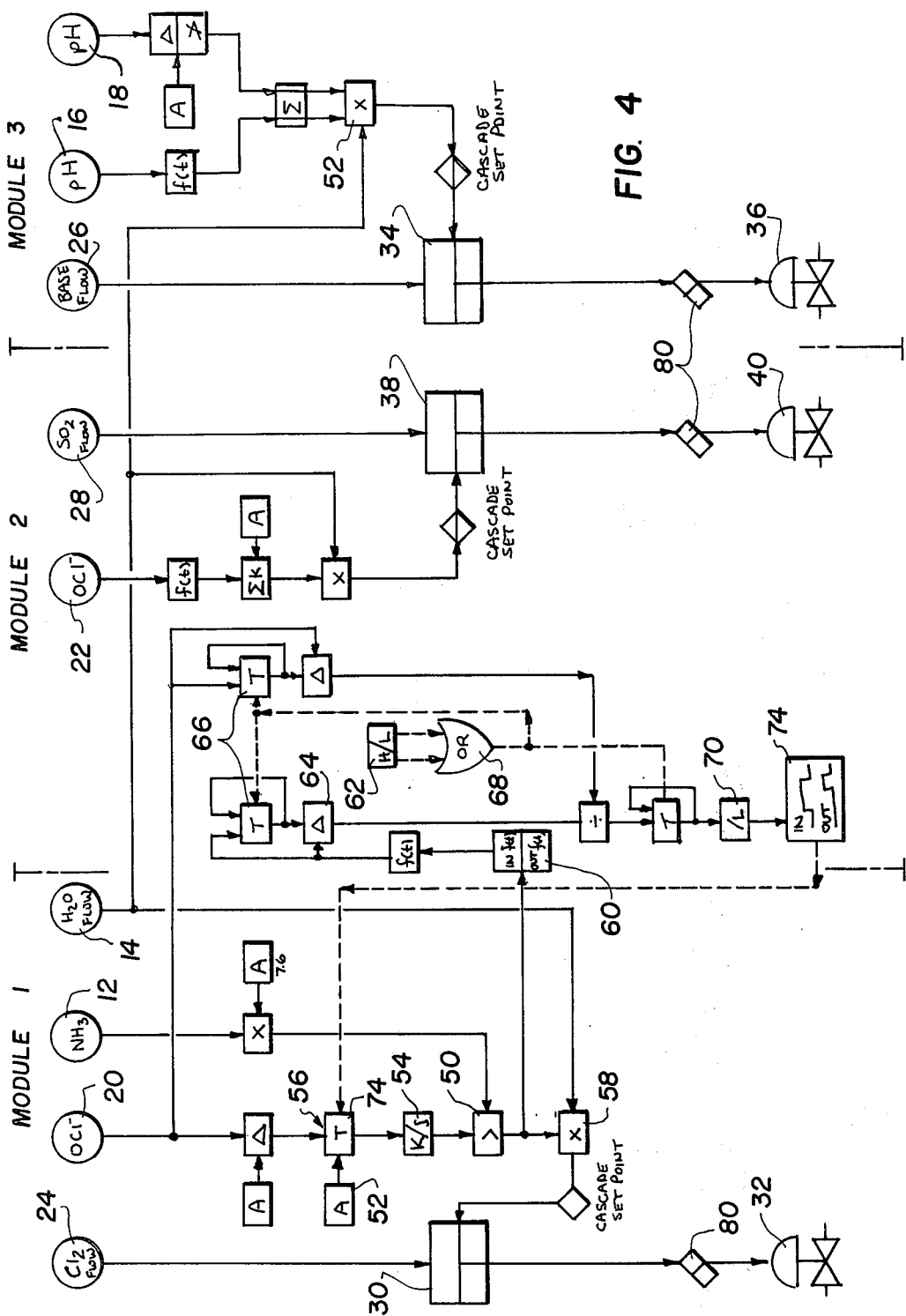
FIG. 4 is a schematic block diagram of the elements in a NETWORK 90 control module used in accordance with the invention.

FIGS. 1 and 4 illustrate the complete breakpoint chlorination control system. The chlorine dose control system employs a cascade. The cascade set point originates from a PID controller 54 measuring OCl$^-$ concentration using transmitter 20. A high select block 50 compares the output of the PID controller to the floor concentration. The floor is calculated by measuring the NH$_3$ concentration with transmitter 12. To provide a set point with mass flow rate units and to compensate for varying feed rates, the waste water flow rate multiplies the concentration in multiplication element 58.

If the dOCl$^-$/dCl$_2$ derivative is negative, the control strategy calls for a ramping of Cl$_2$ dose. In FIG. 1 the instrument labelled 52 and the interlock labelled 56 represent the ramping function to achieve this. The interlock allows the PID signal to pass when the derivative signal is not negative. When dOCl$^-$/dCl$_2$ is less than zero, the interlock selects the ramp. Note that the evaluation of the dOCl$^-$/dCl$_2$ derivative should be in the reaction tank (transmitter 20). In the tank the OCl$^-$ residual is measured by the Cl$_2$ dose is not known. The Cl$_2$ dose is known at the mixer however. Using the known dose, the dose at the tank is calculable with the knowledge of the mixer dynamics. The transfer function generator 60 represents these mixer dynamics. The derivative calculation uses the set point for Cl$_2$ dose from 50 because that signal has less noise than the actual measurement in 20.

The NETWORK 90 Controller Module referred to above, can implement the derivative/interlock system of FIG. 1. The chlorine control is located in Controller Modules 1 and 2 of FIG. 4. The derivative section of Module 2 calculates the dOCl$^-$/dCl$_2$ derivative. The method applied uses a ratio of differences. When the $\Delta$Cl$_2$ dose is large, the high/low alarm block 62 triggers a derivative calculation. The differentials are calculated from data stored in zero order holds 64. Implementation of zero order holds is accomplished with transfer blocks 66. During a hold, the high/low alarm is false causing the block's output to gate in again. During a sample, the high/low alarm is true causing a new value to gate in. The order of calculation of these blocks is important. The difference blocks 64 calculate first, then use boolean H/L blocks 62 and OR block 68 are next. After the divide block, the transfer block may execute in any order. The final elements of the derivative section are a low alarm 70 and a timed-out timer 72. The purpose of these two blocks is to transmit a high boolean signal after the derivative has been negative for a predetermined time interval. This prevents the system from rapid switching when the derivative is near zero. The destination of the boolean signal is a transfer block 74 in Module 1. When the transfer activates, the PID controller sees a fixed error. Then the integrator 54 will slowly ramp the $Cl_2$ concentration, replacing the ramp generator 52 in FIG. 1.

Dechlorination and pH do not require controls as complex as those needed for chlorination. The implementation may involve NETWORK 90 or standard analog equipment. Both pH and $SO_2$ control systems involve cascade loops for flow control and scaling by the main flow rate (see FIGS. 1 and 4).

In FIG. 4, the dotted lines indicate boolean signals and solid lines indicate modulated signals which vary according to quantities measured or calculated. The equipment of FIG. 4 also includes a plurality of manual-/automatic controls 80 which are each shown in their automatic position but which can be manually manipulated to override the automatic control of the respective valves.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

What is claimed is:

1. A method for the breakpoint chlorination of waste water containing an amount of ammonia to be oxidized comprising:
    supplying the waste water at a selected flow rate to a mixer tank;
    measuring the amount of ammonia in the supplied waste water;
    initially dosing the waste water in the mixing tank with a first amount of chlorine which is a selected multiple of the measured ammonia amount by weight;
    supplying the dosed waste water from the mixing tank to a reaction tank where chlorine and ammonia react;
    supplying the waste water out of the reaction tank;
    measuring the residual chlorine in the waste water coming from the reaction tank;
    calculating the derivative of the residual chlorine with respect to the amount of chlorine added to the waste water; and
    with the derivative being negative dosing the mixing tank with a second amount of chlorine according to an induced signal which adds chlorine until the derivative becomes positive.

2. A method according to claim 1, wherein the selected multiple of ammonia by weight is about 7.6.

3. A method according to claim 1, including dosing said mixing tank with an amount of base sufficient to maintain a pH of waste water in the reaction tank at about 7.

4. A method according to claim 3, including supplying the waste water from the reaction tank to a disinfection tank, supplying the waste water from the disinfection tank to a dechlorination tank, measuring a chlorine content of the waste water between the disinfection tank and the dechlorination tank, and adding an amount of sulfur dioxide to the waste water in the dechlorination tank to neutralize the chlorine, the amount of sulfur dioxide added to the dechlorination tank being proportional to the amount of chlorine measured between the disinfection tank and the dechlorination tank.

5. An apparatus for breakpoint chlorination of waste water containing an amount of ammonia to be oxidized comprising;
    a waste water conduit for supplying waste water;
    a mixer tank for receiving waste water from said conduit;
    a reaction tank connected to said mixer tank for receiving waste water therefrom;
    chlorine dosage supply means including an adjustable valve connected to said mixer tank for supplying a selected amount of chlorine to be dosed into waste water in said mixer tank;
    a valve controller connected to said valve;
    an ammonia transmitter connected to said conduit for transmitting an amount of ammonia in the waste water of said conduit;
    an outlet conduit connected to said reaction tank for discharging waste water therefrom;
    a residual chlorine transmitter connected to said outlet conduit for measuring an amount of residual chlorine in the waste water of said outlet conduit; and
    control means connected to said ammonia and residual chlorine transmitters and to said valve controller for controlling said valve to initially supply an amount of chlorine which is a multiple by weight of the ammonia amount, to calculate the derivative of the residual chlorine with respect to the chlorine dosage and, with a negative derivative, to control said valve controller to add additional chlorine until the derivative becomes positive.

6. An apparatus according to claim 5, including a disinfection tank connected to said outlet conduit and a dechlorination tank connected to said disinfection tank, base dosage supply means connected to said mixer tank having an adjustable base dosage valve, a base dosage controller connected to said base dosage valve for adjusting said base dosage valve, pH control means connected to said base dosage controller, a second pH transmitter connected to said outlet conduit for measuring pH in the waste water in said outlet conduit, and pH control means connected to said second pH transmitter and said base dosage controller controlling said base dosage controller to maintain a pH of about 7 in the waste water of the outlet conduit.

7. An apparatus according to claim 6, including sulfur dioxide dosage means including a sulfur dioxide dosage valve connected to said chlorination tank, a sulfur dioxide controller connected to said sulfur dioxide dosage valve for controlling said sulfur dioxide dosage valve to supply an amount of sulfur dioxide to said dechlorination tank sufficient to dechlorinate waste water therein, a chlorine-dosage transmitter connected between said disinfection tank and said dechlorination tank for transmitting an amount of chlorine in waste water supplied from said disinfection tank to said dechlorination tank, and sulfur dioxide control means connected to said sulfur dioxide controller and said chlorine dosage transmitter for supplying a sufficient amount of sulfur dioxide to the chlorinated waste water of said dechlorination tank.

* * * * *